United States Patent
Zhang et al.

(10) Patent No.: US 12,467,998 B2
(45) Date of Patent: Nov. 11, 2025

(54) CEST DATA FITTING METHOD AND APPARATUS BASED ON EXTRAPOLATED SEMISOLID MAGNETIZATION TRANSFER REFERENCE SIGNAL, AND MEDIUM

(71) Applicant: ZHEJIANG UNIVERSITY, Zhejiang (CN)

(72) Inventors: Yi Zhang, Hangzhou (CN); Xingwang Yong, Hangzhou (CN); Dan Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 145 days.

(21) Appl. No.: 18/495,715

(22) Filed: Oct. 26, 2023

(65) Prior Publication Data
US 2024/0053423 A1    Feb. 15, 2024

Related U.S. Application Data

(63) Continuation of application No. PCT/CN2021/140311, filed on Dec. 22, 2021.

(30) Foreign Application Priority Data

Apr. 29, 2021    (CN) .................. 202110475243.0

(51) Int. Cl.
*G01R 33/565* (2006.01)
*A61B 5/055* (2006.01)
*G01R 33/56* (2006.01)

(52) U.S. Cl.
CPC ........ *G01R 33/56563* (2013.01); *A61B 5/055* (2013.01); *G01R 33/5605* (2013.01); *G01R 33/5608* (2013.01)

(58) Field of Classification Search
CPC .......... G01R 33/56563; G01R 33/5605; G01R 33/5608; G01R 33/4828; G01R 33/5601;
(Continued)

(56) References Cited

U.S. PATENT DOCUMENTS

| | | |
|---|---|---|
| 2010/0286502 A1 | 11/2010 | Van Zijl et al. |
| 2013/0166226 A1 | 6/2013 | Lee et al. |

(Continued)

FOREIGN PATENT DOCUMENTS

| | | |
|---|---|---|
| CN | 104204839 A | 12/2014 |
| CN | 104997511 A | 10/2015 |

(Continued)

OTHER PUBLICATIONS

Zaiss, Moritz, et al. "A combined analytical solution for chemical exchange saturation transfer and semi-solid magnetization transfer." NMR in biomedicine 28.2 (2015): 217-230. (Year: 2015).*

(Continued)

*Primary Examiner* — Rishi R Patel
(74) *Attorney, Agent, or Firm* — Wiersch Law Group

(57) ABSTRACT

A CEST data fitting method and apparatus based on an extrapolated semisolid magnetization transfer reference signal, and a medium, which belong to the field of magnetic resonance imaging. According to the CEST data fitting method based on an extrapolated semisolid magnetization transfer reference signal, a lineshape of an MT effect is fused into a Bloch-McConnell equation, the MT effect can be obtained by means of fitting a model that is represented by the equation, and an interference effect can be eliminated by calculating the difference between a curve that is obtained via fitting and a curve that is collected from an experiment. The Bloch-McConnell-based fitting method can take into consideration a radio frequency pulse waveform that is (Continued)

actually used in an experiment, and can also be used when a system is not in steady state.

9 Claims, 3 Drawing Sheets

(58) Field of Classification Search
CPC ....... A61B 5/055; A61B 5/0033; G06F 17/13; G06F 17/16
See application file for complete search history.

(56) References Cited

U.S. PATENT DOCUMENTS

| | | |
|---|---|---|
| 2016/0334485 A1 | 11/2016 | Miyoshi |
| 2018/0164393 A1 | 6/2018 | Ellingson et al. |
| 2019/0011516 A1 | 1/2019 | Sun et al. |
| 2021/0063512 A1 | 3/2021 | Michaeli et al. |

FOREIGN PATENT DOCUMENTS

| | | | |
|---|---|---|---|
| CN | 110706199 | A | 1/2020 |
| CN | 111413655 | A | 7/2020 |
| CN | 111566497 | A | 8/2020 |
| CN | 113171076 | A | 7/2021 |
| JP | 2017086667 | A | 5/2017 |

OTHER PUBLICATIONS

International Search Report (PCT/CN2021/140311); Date of Mailing: Mar. 22, 2022.
First Office Action(CN202110475243.0); Date of Mailing: Nov. 25, 2021.
Methods-and-applications-for-chemical-exchange-saturation-transfer-magnetic-resonance-imaging.
Brain-imaging-with-chemical-exchange-saturation-transfer-technique-and-clinical-application.
Optimal-Sampling-Schedule-for-Model-Based-Quantification-of-Chemical-Exchange-Saturation-Transfer-MRI.
Influences-of-experimental-parameters-on-chemical-exchange-saturation-transfer-(CEST)-metrics-of-brain-tumor-using-animal-models-at-4.7T.
Quantifying-Amide-Proton-Exchange-rate-and-Concentration-in-Chemical-Exchange-Saturation-Transfer-Imaging-of-the-Human-Brain.
Simplified-and-scalable-numerical-solution-for-describing-multi-pool-chemical-exchange-saturation-transfer-(CEST)-MRI-contrast.
Japanese Office Action for Application No. 2023-566736, mailed Aug. 5, 2024 (6 pages).
Improving the Detection Sensitivity of pH-Weighted Amide Proton Transfer MRI in Acute Stroke Patients Using Extrapolated Semi-solid Magnetization Transfer Reference Signals (10 pages).
Quantitative Interpretation of Magnetization Transfer (8 pages).

* cited by examiner

CEST DATA FITTING METHOD AND APPARATUS BASED ON EXTRAPOLATED SEMISOLID MAGNETIZATION TRANSFER REFERENCE SIGNAL, AND MEDIUM

CROSS-REFERENCE TO RELATED APPLICATIONS

The present application is a continuation of International Application No. PCT/CN2021/140311, filed on Dec. 22, 2021, which claims priority to Chinese Application No. 202110475243.0, filed on Apr. 29, 2021, the contents of both of which are incorporated herein by reference in their entireties.

TECHNICAL FIELD

The present disclosure belongs to the technical field of magnetic resonance imaging and in particular, to a CEST data fitting method, an apparatus and a medium based on an extrapolated semisolid magnetization transfer reference signal.

BACKGROUND

Chemical exchange saturation transfer (CEST) imaging is a kind of magnetic resonance molecular imaging technology, which can detect free protein and polypeptide in a living body. CEST imaging has been applied in many clinical fields, such as grading brain tumors, monitoring early response to radiotherapy and chemotherapy, predicting tumor markers, and detecting ischemic stroke. However, CEST signals are easily influenced by many effects. Domestic and foreign researchers have proposed a variety of methods for calculating CEST signals to eliminate these interference effects. These methods can be roughly divided into two categories: one is to calculate the difference between a reference signal and a labeling signal to obtain the final signal, and the other is to fit the model to obtain the final signal. The magnetization transfer ration asymmetry ($MTR_{asym}$) assumes that (1) the reference signal does not contain a CEST effect; (2) the labeling signal contains a CEST effect; (3) other effects are equal in the reference signal and the labeling signal. An experimental signal is then subtracted from the reference signal, which eliminates other effects and only retains the CEST effect. However, other interference effects are not all equal in the reference signal and the labeling signal, such as the Magnetization transfer (MT) effect of macromolecules, and the signal obtained by the $MTR_{asym}$ method thus contains other effects. Multi-pool Lorenzian fitting assumes that the curve of each effect is a Lorenzian curve, and these Lorenzian curves are superimposed to form the curve collected through the experiment. By fitting the curve collected through the experiment, the value of each effect can be obtained. However, the curves of other effects are not all Lorenzian curves, such as MT, the curve thereof is super Lorenzian. The curve fitted by extrapolated semi-solid magnetization transfer reference (EMR) represents other effects except the CEST effect. The CEST effect can be obtained by calculating the difference between the curve fitted by EMR and the curve obtained from the experiment. EMR assumes that the saturation pulse used in the experiment is a square wave and the system has reached a steady state, but these two conditions are not always met.

SUMMARY

The model fitting method in the prior art approximates the experimental conditions, but this approximation is not valid under many experimental conditions. Therefore, the object of the present disclosure is to solve the problems existing in the prior art, and provide a robust CEST Numerical Fit of Extrapolated Semisolid Magnetization Transfer Reference Signal (NEMR) method which is suitable for various experimental conditions in eliminating the CEST imaging interference effect.

The specific technical solution adopted by the present disclosure is as follows:

In the first aspect, the present disclosure provides a CEST data fitting method based on an extrapolated semisolid magnetization transfer reference signal. S1 to S3 are executed in sequence for each voxel in a CEST image to obtain a CEST effect value of each voxel whose background interference signals are eliminated; S1 to S3 are as follows:

S1, performing a offset correction with a main magnetic field frequency B0 on an obtained original Z spectrum to obtain a corrected Z spectrum;

S2, taking part of data points in the corrected Z spectrum only containing an MT effect as fitting sample data, and fitting a two-pool model preset with initial values and upper and lower limits of undetermined parameters to obtain fitted values of the undetermined parameters;

the two-pool model is expressed as $\vec{M}(t+\Delta t) = \exp(\hat{A}\Delta t)\vec{M}(t)$ where exp represents an exponential function based on a natural constant e; $\Delta t$ represents an increment at a time t; $\vec{M}(t+\Delta t)$ and $\vec{M}(t)$ are respectively magnetization vectors of a time $t+\Delta t$ and the time t, where $$\vec{M} = \begin{pmatrix} M \\ 1 \end{pmatrix}$$

a matrix $M = [M_{xa}, M_{ya}, M_{za}, M_{zb}]^T$, $M_{xa}$, $M_{ya}$, $M_{za}$, $M_{zb}$, are respectively an x-direction magnetization of a water group, a y-direction magnetization of the water group, a z-direction magnetization of the water group and a z-direction magnetization of an MT group; a coefficient matrix $$\hat{A} = \begin{pmatrix} A & C \\ 0 & 0 \end{pmatrix},$$

in which a matrix $$A = \begin{pmatrix} -R_{2a} & -\Delta\omega_a & 0 & 0 \\ \Delta\omega_a & -R_{2a} & -\omega_1 & 0 \\ 0 & \omega_1 & -R_{1a} - k_{ab} & k_{ba} \\ 0 & 0 & k_{ab} & -R_{1b} - R_{rfb} - k_{ba} \end{pmatrix},$$

a vector $C = [0, 0, R_{1a}M_{0a}, T_{1b}M_{0b}]^T$, $\Delta\omega_a$ represents a frequency difference between an externally applied radiofrequency pulse and water, $\omega_1$ represents an applied radiofrequency pulse intensity, $k_{ab}$ represents an exchange rate from the water group to the MT group, $k_{ba}$ represents an exchange rate from the MT group to the water group, $R_{rfb}$ represents an the loss rate of the longitudinal magnetization of pool b caused by saturation pulses, $\Delta\omega_b$ represents a frequency difference between the externally applied radiofrequency pulse and MT, $R_{1a}=1/T_{1a}$ and $R_{2a}=1/T_{2a}$ are respectively a longitudinal relaxation rate and a transverse relaxation rate of the water group, $R_{1b}=1/T_{1b}$ and $R_{2b}=1/T_{2b}$ are respectively a longitudinal relaxation rate and a transverse relaxation rate of the MT group, $M_{0a}$ and $M_{0b}$ are respectively steady-state magnetization intensities of the water group and the MT group;

the undetermined parameters in the two-pool model are $T_{1a}$, $T_{2a}$, $T_{2b}$, $M_{0b}$, $k_{ba}$;

S3, obtaining a fitted curve containing the MT effect based on the two-pool model into which the fitted values are substituted, and taking a difference between the fitted Z spectrum and experimentally measured corrected Z spectrum at a frequency of interest as the CEST effect value for eliminating the background interference signals.

As a preference of the first aspect, in S2, there are two rounds of fitting for the undetermined parameters in the two-pool model; in a first round of fitting, parameter optimization is performed for all five undetermined parameters within the preset upper and lower limits thereof by using the fitting sample data to obtain a first round of fitted values; in a second round of fitting, upper and lower limits narrower than the upper and lower limits of the first round of fitting are selected with the first round of fitted value as the center, and the two-pool model is fitted with the same fitting sample data as in the first round of fitting for a second round with a higher precision to obtain final fitted values of the undetermined parameters;

further preferably, in the second round of fitting, only part of the five undetermined parameters of the two-pool model are selected for adjustment of upper and lower limits thereof, and the upper and lower limits of the remaining parameters keep consistent with those of the first round of fitting;

still further preferably, in the second round of fitting, a parameter combination of the upper and lower limits is required to be changed to $T_{1a}$, $T_{2b}$, $M_{0b}$, $T_{1a}$, $T_{2b}$, or $T_{2b}$, $M_{0b}$.

As a preference of the two-round fitting solution in the first aspect, in S2, the data points only containing the MT effect are data points with frequencies ranging from 80 to 6 ppm, preferably data points with frequencies ranging from 80 to 20 ppm.

As a preference of the two-round fitting solution in the first aspect, in S2, in the first round of fitting, the preset upper limits of the undetermined parameters $T_{1a}$, $T_{2a}$, $T_{2b}$, $M_{0b}$, $k_{ba}$ are [1.5, 0.25, 12e$^{-6}$, 0.16, 40], and the preset lower limits are [0.6, 0.065, 8e$^{-6}$, 0.001, 20].

As a preference of the two-round fitting solution in the first aspect, in S2, in the second round of fitting, for the parameters whose upper and lower limits need to be changed, the upper limit values thereof are changed to 120%-150% of the first-round fitted values of the parameters, and the lower limit values are changed to 80%-50% of the first-round fitted values of the parameters; further, the upper limit values thereof are changed to 120% of the first-round fitted values of the parameters, and the lower limit values are changed to 80% of the first-round fitted values of the parameters.

As a preference of the two-round fitting solution in the first aspect, in S2, an the loss rate of the longitudinal magnetization of pool b caused by saturation pulses is $R_{rfb}=\omega_1^2\pi g(2\pi\Delta\omega_b)$, where g(·) is a lineshape function, including Lorentzian type, Gaussian type or super Lorentzian type.

Further preferably, in S3, the frequency of interest is 3.5 ppm or −3.5 ppm, a CEST effect value corresponding to the frequency of interest of 3.5 ppm is an APT[#] value, and a CEST effect value corresponding to the frequency of interest of −3.5 ppm is NOE[#].

In a second aspect, the present disclosure provides a computer-readable storage medium; a computer program is stored on the storage medium, and when executed by a processor, the computer program implements CEST data fitting method based on the extrapolated semisolid magnetization transfer reference signal according to any one of the first aspect.

In a third aspect, the present disclosure provides a CEST data fitting apparatus based on the extrapolated semisolid magnetization transfer reference signal, including a processor and a storage medium, where a computer program is stored on the storage medium, and when executed by the processor, the computer program implements the CEST data fitting method based on the extrapolated semisolid magnetization transfer reference signal according to any one of the first aspect.

In a fourth aspect, the present disclosure provides a magnetic resonance imaging apparatus for eliminating a CEST imaging interference effect, including a magnetic resonance scanner and a control unit; the magnetic resonance scanner is configured for acquiring a CEST image by magnetic resonance CEST imaging; the control unit is able to acquire the CEST image, and a computer program is stored in the control unit; when executed, the computer program is configured for implementing the CEST data fitting method based on the extrapolated semisolid magnetization transfer reference signal according to any one of the first aspect, and outputting a CEST effect value of each voxel whose background interference signals are eliminated.

Compared with the prior art, the present disclosure has the following beneficial effects.

The fitting method proposed by the present disclosure is essentially a step-by-step solution to the BM equation, which has two advantages. Firstly, because NEMR iterates in the time dimension, the waveform of the actually used radio-frequency pulse can be included in the solution process, instead of assuming that the waveform is a rectangular wave. Secondly, the NEMR method uses a BM equation simulation to describe the CEST effect, instead of simplified analytical expression, which makes it applicable even when the system is not in steady state. The BM equation is the fundamental equation to describe the CEST effect, and simulation and iteration on this basis can accurately restore physiological parameter values.

DESCRIPTION OF EMBODIMENTS

Figure 1:
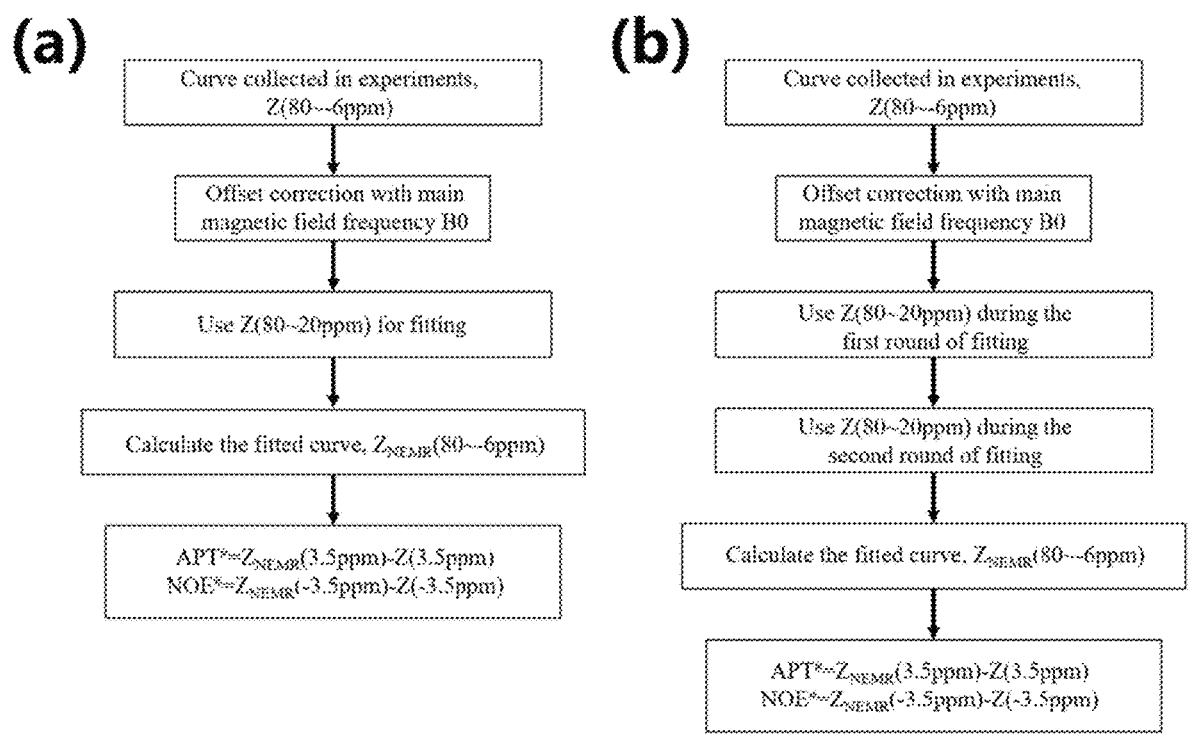
FIG. 1 is a flow chart of the fitting method of the present disclosure.

The present disclosure will be further elaborated and explained with the attached drawings and specific embodiments.

The present disclosure provides a method for eliminating the CEST imaging interference effect, which is called Numerical Fit of Extrapolated Semisolid Magnetization Transfer Reference Signal (NEMR). The CEST data fitting method based on an extrapolated semisolid magnetization transfer reference signal integrates the line shape of an MT effect into a Bloch-McConnell (BM) equation. By fitting the model represented by this equation, the MT effect can be obtained, and the interference effect can be removed by calculating the difference between a fitted curve and a curve collected in the experiment.

The core of the present disclosure is to integrate the line shape of MT into the BM equation through reasonable approximation to form a two-pool model for subsequent fitting. The principle of the two-pool model is described in detail below.

the imaging process of magnetic resonance can be described by the following Bloch equation, $$dM_x/dt = -M_x R_2 - (\omega_w - \omega) M_y$$

$$dM_y/dt = (\omega_w - \omega) M_x - M_y R_2 - \omega_1 M_z$$

$$dM_z/dt = \omega_1 M_y - M_z R_1 + M_0 R_1$$

where $M_x$, $M_y$ and $M_z$ are respectively the magnetization in x, y and z directions, $\omega_w$ and $\omega$ are respectively the magnetic resonance frequency of water and the frequency of an externally applied radio-frequency pulse, $\omega_1$ is the intensity of the applied radio-frequency pulse, $R_1 = 1/T_1$ and $R_2 = 1/T_2$ are respectively the longitudinal and transverse relaxation rates, $M_0$ indicates a steady-state magnetization intensity. The equation only describes the situation that the magnetization of water changes with time under the influence of the radio-frequency pulse. For a system with two exchange groups (a water group a; a MT group b) can be described by the following equation (it should be noted that the subscript a in the following equation represents the relevant parameters of the water group, while the subscript b represents the relevant parameters of the MT group):

$$\frac{dM_{xa}}{dt} = -\Delta\omega_a M_{ya} - R_{2a} M_{xa}$$

$$\frac{dM_{ya}}{dt} = \Delta\omega_a M_{xa} - R_{2a} M_{ya} - \omega_1 M_{za}$$

$$\frac{dM_{za}}{dt} = \omega_1 M_{ya} - R_{1a}(M_{za} - M_{0a}) + k_{ba} M_{zb} - k_{ab} M_{za}$$

$$\frac{dM_{xb}}{dt} = -\Delta\omega_b M_{yb} - R_{2b} M_{xb}$$

$$\frac{dM_{yb}}{dt} = \Delta\omega_b M_{xb} - R_{2b} M_{yb} - \omega_1 M_{zb}$$

$$\frac{dM_{zb}}{dt} = \omega_1 M_{yb} - R_{1b}(M_{zb} - M_{0b}) + k_{ab} M_{za} - k_{ba} M_{zb}$$

where $\Delta\omega_a = \omega - \omega_a$ a represents a frequency difference between the externally applied radio-frequency pulse and the water; $k_{ij}$ (i=a or b; j=a or b) indicates the exchange rate between the two groups i and j (for example, $k_{ab}$ indicates the exchange rate from the water group a to the MT group b).

As $T_2$ of the MT group is on the order of microseconds, $M_{xb}$, $M_{yb}$ quickly reach a steady state, that is, $$0 = -\Delta\omega_b M_{yb} - R_{2b} M_{xb}$$

$$0 = \Delta\omega_b M_{xb} - R_{2b} M_{yb} - \omega_1 M_{zb}$$

$$\frac{dM_{zb}}{dt} = \omega_1 M_{yb} - R_{1b}(M_{zb} - M_{0b}) + k_{ab} M_{za} - k_{ba} M_{zb}$$

It can be solved to obtain $$M_{yb} = -\frac{\omega_1 R_{2b}}{(\Delta\omega_b)^2 + (R_{2b})^2} M_{zb},$$

and if it is defined that $$R_{rfb} = \frac{\omega_1^2 R_{2b}}{(\Delta\omega_b)^2 + (R_{2b})^2}$$

is the loss rate of the longitudinal magnetization of pool b caused by saturation pulses, $M_{yb}$ may be further expressed as $\omega_1 M_{yb} = -R_{rfb} M_{zb}$, then the differential equation about $M_{zb}$ can be written as, $$\frac{dM_{zb}}{dt} = -R_{rfb} M_{zb} - R_{1b}(M_{zb} - M_{0b}) + k_{ab} M_{za} - k_{ba} M_{zb}$$

The $R_{rfb}$ of the above-mentioned MT group can also be expressed by a lineshape function, $R_{rfb} = \omega_1^2 \pi g(2\pi\Delta\omega_b)$ the lineshape function $g(\cdot)$ can be of a Lorentzian type, a Gaussian type, a super Lorentzian type and other forms where:

Lorentzian type is:

$$g(2\pi\Delta\omega_b) = \frac{T_{2b}}{\pi} \frac{1}{\left[1 + (2\omega\Delta\omega_b T_{2b})^2\right]};$$

Gaussian type is:

$$g(2\pi\Delta\omega_b) = \frac{T_{2b}}{\sqrt{2\pi}} e^{\frac{-(2\pi\Delta\omega_b T_{2b})^2}{2}}$$

Super Lorentzian type is:

$$g(2\pi\Delta\omega_b) = \int_0^{\pi/2} d\theta \sin\theta \sqrt{\frac{2}{\pi}} \frac{T_{2b}}{(3\cos^2\theta - 1)} e^{-2\left(\frac{2\pi\Delta\omega_b T_{2b}}{3\cos^2\theta - 1}\right)^2}$$

After the above simplification, the original six equations become four:

$$\frac{dM_{xa}}{dt} = -\Delta\omega_a M_{ya} - R_{2a} M_{xa}$$

$$\frac{dM_{ya}}{dt} = \Delta\omega_a M_{xa} - R_{2a} M_{ya} - \omega_1 M_{za}$$

$$\frac{dM_{za}}{dt} = \omega_1 M_{ya} - R_{1a}(M_{za} - M_{0a}) + k_{ba} M_{zb} - k_{ab} M_{za}$$

$$\frac{dM_{zb}}{dt} = -R_{rfb} M_{zb} - R_{1b}(M_{zb} - M_{0b}) + k_{ab} M_{za} - k_{ba} M_{zb}$$

These four differential equations can be expressed as:

$$\frac{dM}{dt} = AM + C$$

where $M = [M_{xa}, M_{ya}, M_{za}, M_{zb}]^T$ $$A = \begin{pmatrix} -R_{2a} & -\Delta\omega_a & 0 & 0 \\ \Delta\omega_a & -R_{2a} & -\omega_1 & 0 \\ 0 & \omega_1 & -R_{1a}-k_{ab} & k_{ba} \\ 0 & 0 & k_{ab} & -R_{1b}-R_{rfb}-k_{ba} \end{pmatrix},$$

$C=[0, 0, R_{1a}M_{0a}, T_{1b}M_{0b}]^T$

It can be further transformed into a homogeneous differential equation:

$$\dot{\vec{M}} = \overset{\circ}{A}\vec{M}$$

$$\vec{M} = \begin{pmatrix} M \\ 1 \end{pmatrix}, \overset{\circ}{A} = \begin{pmatrix} A & C \\ 0 & 0 \end{pmatrix}$$

The solution of the above homogeneous differential equation can be expressed as $$\vec{M}(t+\Delta t) = \exp(\overset{\circ}{A}\Delta t) \vec{M}(t)$$

where $\vec{M}(t+\Delta t)$ is the magnetization vector at the time $t+\Delta t$.

The solution of the homogeneous differential equation is the two-pool model of the present disclosure, which has five unknowns, namely $T_{1a}$, $T_{2a}$, $T_{2b}$, $M_{0b}$, $k_{ba}$ the other parameters being known quantities. Through the fitting of this model, a fitted curve including the MT effect can be obtained. The difference between the fitted curve and the Z spectrum curve corrected by the offset with the main magnetic field frequency B0 is a cleaner CEST effect.

It should be noted that the present disclosure can be used to obtain different CEST effect values, but because different CEST effect values correspond to different frequencies on the curve, in order to facilitate the representation, the frequency that can reflect a certain CEST effect on the Z spectrum is called a frequency of interest in the present disclosure. For example, if the CEST effect value to be calculated is APT[#] (Amide proton transfer signal from NEMR analysis) value, the corresponding frequency of interest is 3.5 ppm; if the CEST effect value to be calculated is NOE[#] (Numerical Fit of Extrapolated Semisolid Magnetization Transfer Reference Signal, the corresponding frequency of interest is −3.5 ppm. Of course, if there are other frequencies on the Z spectrum that can also reflect a certain CEST effect, they can also be used as the frequencies of interest. By calculating the difference between the fitted curve and the corrected Z spectrum at the frequency of interest, the CEST effect value corresponding to the frequency of interest can be obtained. In the implementation process of the present disclosure, one CEST effect value can be calculated in a single time, and multiple CEST effect values can be calculated at the same time, which is not limited.

Based on the above principles, the present disclosure provides two CEST data fitting methods based on an extrapolation of magnetization transfer signal. As shown in (a) and (b) in FIG. 1, the difference between the two methods is that the parameter fitting method of the two-pool model is different. The first method is a single-round of fitting, while the second method is two rounds of fitting, with the rest being the same. The following two methods will be illustrated by examples respectively.

Example 1

In this example, as shown in FIG. 1(a), the implementation flow of the NEMR fitting method using the above first fitting method is shown. This method needs to obtain a CEST image first, and then S1-S3 are executed for each voxel in the CEST image in turn to obtain the APT[#] value and NOE[#] value of each voxel, thus forming an APT[#] image and NOE[#] image. The specific implementation process of S1 to S3 will be described below.

S1, an offset correction with a main magnetic field frequency B0 is performed on an obtained original Z spectrum to obtain a corrected Z spectrum; the offset correction with the main magnetic field frequency B0 belongs to the prior art and thus will not be described here.

S2, part of data points in the corrected Z spectrum only containing an MT effect is taken as fitting sample data, and a two-pool model preset with initial values and upper and lower limits of undetermined parameters is fitted to obtain fitted values of the undetermined parameters.

As described above, the two-pool model in the present disclosure is expressed as $$\vec{M}(t+\Delta t) = \exp(\overset{\circ}{A}\Delta t) \vec{M}(t)$$

where exp represents an exponential function based on a natural constant e; $\Delta t$ represents an increment at a time t; $\vec{M}(t+\Delta t)$ and $\vec{M}(t)$ are respectively magnetization vectors of a time $t+\Delta t$ and the time t, where $$\vec{M} = \begin{pmatrix} M \\ 1 \end{pmatrix}$$

a matrix $M=[M_{xa}, M_{ya}, M_{za}, M_{zb}]^T$, $M_{xa}$, $M_{ya}$, $M_{za}$, $M_{zb}$ are respectively an x-direction magnetization of a water group, a y-direction magnetization of the water group, a z-direction magnetization of the water group and a z-direction magnetization of an MT group; a coefficient matrix $$\overset{\circ}{A} = \begin{pmatrix} A & C \\ 0 & 0 \end{pmatrix},$$

in which a matrix $$A = \begin{pmatrix} -R_{2a} & -\Delta\omega_a & 0 & 0 \\ \Delta\omega_a & -R_{2a} & -\omega_1 & 0 \\ 0 & \omega_1 & -R_{1a}-k_{ab} & k_{ba} \\ 0 & 0 & k_{ab} & -R_{1b}-R_{rfb}-k_{ba} \end{pmatrix},$$

a vector $C=[0, 0, R_{1a}M_{0a}, R_{1b}M_{0b}]^T$, $\Delta\omega_a$ represents a frequency difference between an externally applied radio-frequency pulse and water, $\omega_1$ represents an applied radio-frequency pulse intensity, $k_{ab}$ represents an exchange rate from the water group to the MT group, $k_{ba}$ represents an exchange rate from the MT group to the water group, $R_{rfb}$ represents an the loss rate of the longitudinal magnetization of pool b caused by saturation pulses, a parameter $R_{rfb}=\omega_1^2\pi g(2\pi\Delta\omega_b)$, where g(·) is a super Lorentzian type, $\Delta\omega_b$ represents a frequency difference between the externally applied radio-frequency pulse and MT, $R_{1a}=1/T_{1a}$ and $R_{2a}=1/T_{2a}$ are respectively a longitudinal relaxation rate and a transverse relaxation rate of the water group, $R_{1b}=1/T_{1b}$ and $R_{2b}=1/T_{2b}$ are respectively a longitudinal relaxation rate and a transverse relaxation rate of the MT group, $M_{0a}$ and $M_{0b}$ are respectively steady-state magnetization of the water group and the MT group.

In the above two-pool model, it is necessary to carry out subsequent parameter fitting for five undetermined parameters $T_{1a}$, $T_{2a}$, $T_{2b}$, $M_{0b}$, $k_{ba}$. Only some data points containing an MT effect can be analyzed and determined according to the actual original Z spectrum, and in this embodiment, data points with frequencies ranging from 80 to 20 ppm are preferred.

For the first method, the five undetermined parameters $T_{1a}$, $T_{2a}$, $T_{2b}$, $M_{0b}$, $k_{ba}$ can be directly fitted by using the fitting sample data. Within the respective upper and lower limits of the five undetermined parameters, the fitted values of the five undetermined parameters that make the whole two-pool model equation fit to the highest degree are obtained. The specific fitting method can be realized by MATLAB, SPSS and other existing technologies, and the fitting degree can be expressed by a minimum mean square error.

During fitting, the preset upper and lower limits and initial values of the undetermined parameters $T_{1a}$, $T_{2a}$, $T_{2b}$, $M_{0b}$, $k_{ba}$ can be adjusted according to the actual situation, as long as they meet the normal value range of each parameter. In this example, the preset upper limits of the numbers $T_{1a}$, $T_{2a}$, $T_{2b}$, $M_{0b}$, $k_{ba}$ are set to [1.5, 0.25, 12e$^{-6}$, 0.16, 40], the preset lower limits are set to [0.6, 0.065, 8e$^{-6}$, 0.001, 20], and the initial values are all set to their respective lower limits.

S3, based on the two-pool model with five substituted fitted values, a fitted curve containing the MT effect can be obtained, where the frequency ω in the two-pool model is the abscissa of the curve and $M_{za}$ in the two-pool model is the vertical ordinate of the curve. The Z spectrum after main magnetic field B0 frequency correction is subtracted from the fitted curve to obtain a difference curve, and the corresponding vertical ordinate values with the abscissa of 3.5 ppm and −3.5 ppm on this difference curve are taken and recorded as the APT$^{\#}$ value and NOE$^{\#}$ value, respectively. Of course, from the simplification point of view, the difference curve is not necessarily obtained, and as long as the difference between the vertical ordinate value corresponding to 3.5 ppm on the fitted curve and the vertical ordinate value corresponding to 3.5 ppm on the Z spectrum after main magnetic field B0 frequency correction can be calculated, it can be regarded as the APT$^{\#}$ value of the current voxel, and at the same time, the difference between the vertical ordinate value corresponding to −3.5 ppm on the fitted curve and the vertical ordinate value corresponding to −3.5 ppm on the Z spectrum after main magnetic field B0 frequency correction can be calculated and regarded as the NOE$^{\#}$ value of the current voxel.

After each voxel in the whole CEST image obtains its corresponding APT$^{\#}$ value and NOE$^{\#}$ value, an APT$^{\#}$ image and a NOE$^{\#}$ image can be formed, where the value of each position in the APT$^{\#}$ image is the corresponding APT$^{\#}$ value of the voxel at that position, and the value of each position in the NOE$^{\#}$ image is the corresponding NOE$^{\#}$ value of the voxel at that position.

In order to further demonstrate the technical effect of the above method, the NEMR fitting method was tested on a brain CEST image of an ischemic stroke patient. In this embodiment, the CEST imaging sequence used for image acquisition consisted of three modules: (1) a CEST saturation module, which contained 10 Gaussian waveform saturation pulses, each of which had a duration of about 100 ms and an amplitude of 1 μT; (2) a spectrum pre-saturation inversion recovery fat pressing module; (3) a fast spin echo acquisition module.

As shown in FIG. 1(a), firstly, the offset correction with the main magnetic field frequency B0 was performed on the collected Z spectrum data (as shown in the experimental curve in FIG. 2, the frequency range is 80 to −6 ppm), and then NEMR fitting was performed. The first round of fitting used data with a frequency of 80 to 20 ppm as fitting sample data (the points used for fitting are shown in FIG. 2). The upper limits of the unknown parameters $T_{1a}$, $T_{2a}$, $T_{2b}$, $M_{0b}$, $k_{ba}$ were [1.5, 0.25, 12e$^{-6}$, 0.16, 40], the lower limits were [0.6, 0.065, 8e$^{-6}$, 0.001, 20], and the initial values were equal to the lower limits. The final fitted curve is shown in FIG. 2.

Figure 3:
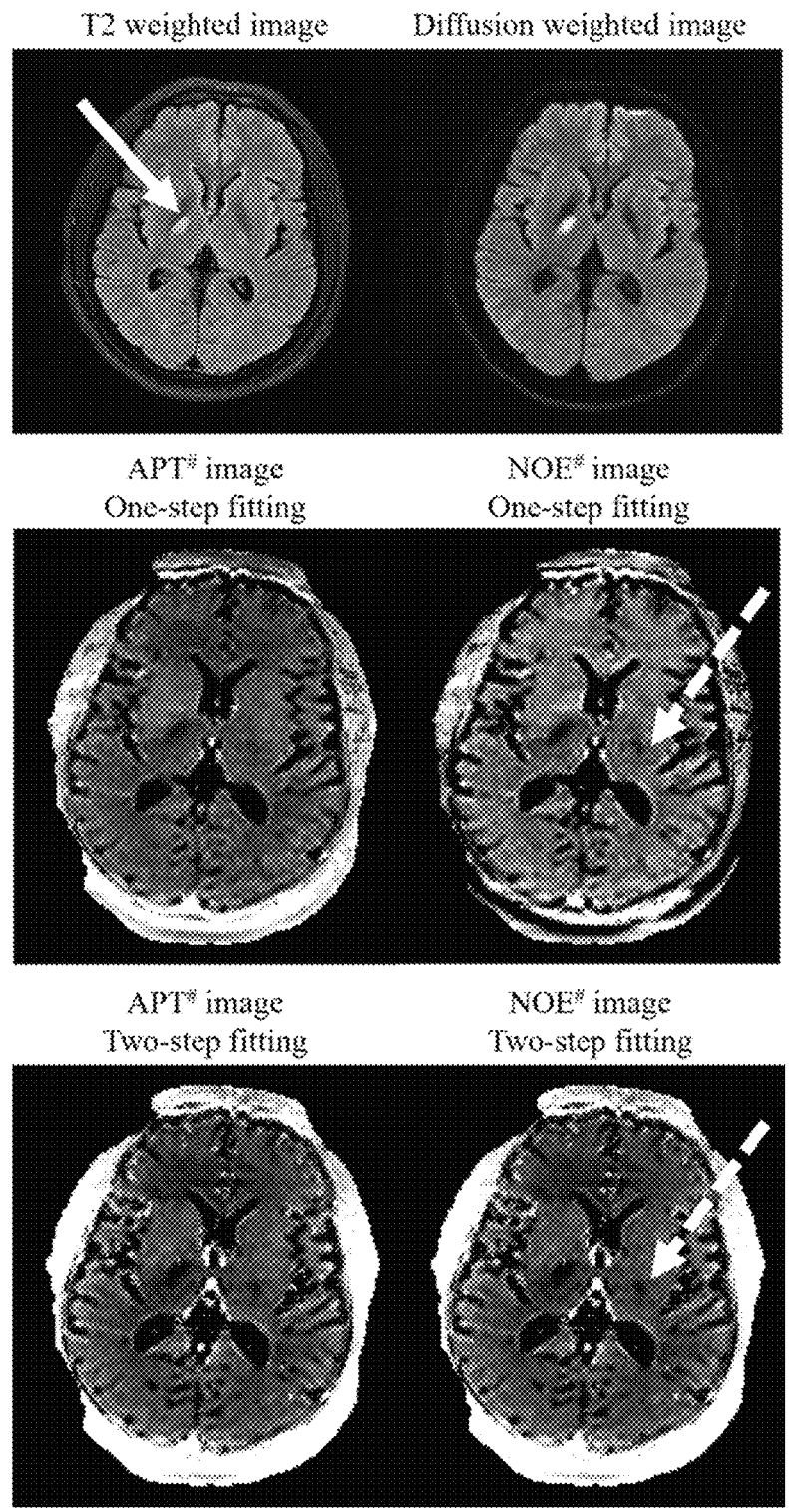
FIG. 3 is a T2-weighted image, a diffusion-weighted image, an APT[#] image and a NOE[#] image of an ischemic stroke patient according to an embodiment.

The experimental results of this embodiment are shown in FIG. 3. It can be seen that the APT$^{\#}$ image and the NOE$^{\#}$ image fitted by the one-step fitting method can clearly show the lesions that can be seen in other modals (lesions on T2-weighted images, white solid arrows), and can also show the lesions that are invisible in other modalities (lesions on the NOE$^{\#}$ images, white dashed arrows).

Example 2

In this example, as shown in FIG. 1(b), the implementation flow of the NEMR method using the above second fitting method is shown. Similarly, this method needs to obtain a CEST image first, and then S1-S3 are executed for each voxel in the CEST image in turn to obtain the APT$^{\#}$ value and NOE$^{\#}$ value of each voxel, thus forming an APT$^{\#}$ image and a NOE$^{\#}$ image.

S1 and S3 of this embodiment were the same as those of Example 1, except that in step S2, the fitting of the undetermined parameters in the two-pool model had two rounds: the first round of fitting was the same as that in Example 1. Firstly, all the five undetermined parameters were optimized within their preset upper and lower limits by using the fitting sample data to obtain the first round of fitted values. The initial values of the five undetermined parameters were also set to their respective lower limits.

However, the multi-parameter fitting is greatly influenced by the upper and lower limits of variables, and some parameters will be equal to the given boundary values, therefore this example needed to set a second-step fitting to alleviate this problem. In the second round of fitting, the upper and lower limits narrower than the upper and lower limits of the first round fitting could be selected with the first round fitted value as a center, and the same fitting sample data as in the first round fitting could be re-used for the second round of fitting on the above two-pool model with a higher precision to obtain the final fitted values of the undetermined parameters. In the specific implementation process, not the upper and lower limits of all the five undetermined parameters of the two-pool model need to be adjusted, and some parameters can be selected from the five undetermined parameters of the two-pool model to further expand their upper and lower limits, and the upper and lower limits of the remaining parameters are still consistent with the first round of fitting. In this embodiment, in the second round of fitting, the parameter combination that needs to change the upper and lower limit values is $T_{1a}$, $T_{2a}$, $M_{0b}$.

In this example, by limiting some parameters (such as $T_{1a}$, $T_{2b}$, $M_{0b}$) near the results of the first round, these parameters could be changed in a small range, thus reducing the influence of improper setting of upper and lower limits on the final results.

In addition, for the first round fitted values that need to change upper and lower limits, the change range of their upper and lower limits should not be too large but not too small. In this example, for the three parameters $T_{1a}$, $T_{2b}$, $M_{0b}$ whose upper and lower limit values need to be changed, the upper limit values of the parameters used in the second round fitting were preferably changed to 120% of the first round of fitted values of the parameters, and the lower limit values of the parameters used in the second round fitting were preferably changed to 80% of the first round of fitted values of the parameters, so as to further optimize these parameters near the first round of fitted values.

In order to further demonstrate the technical effect of the above method, the NEMR fitting method was tested on a brain CEST image of an ischemic stroke patient. In this example, the CEST imaging sequence used for image acquisition was the same as that in Example 1.

Figure 2:
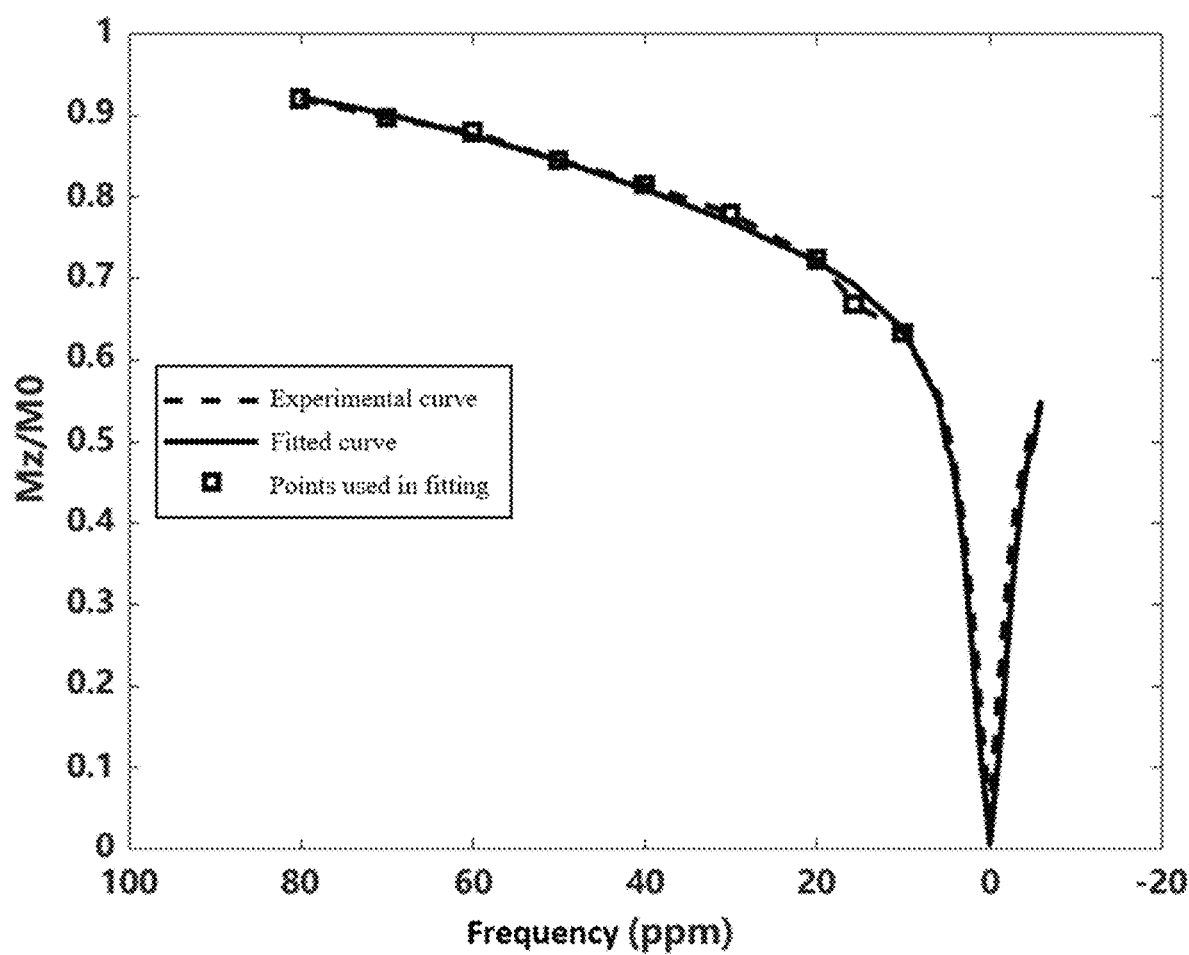
FIG. 2 is a curve collected by experiment and a fitted curve graph thereof according to an embodiment.

As shown in FIG. 1($b$), firstly, the offset correction with the main magnetic field frequency B0 was performed on the collected data, and then NEMR fitting was performed. The first round of fitting used data with a frequency of 80-20 ppm as fitting sample data. The upper limits of unknown parameters $T_{1a}$, $T_{2a}$, $T_{2b}$, $M_{0b}$, $k_{ba}$ to be fitted were [1.5, 0.25, 12e−6, 0.16, 40], the lower limits were [0.6, 0.065, 8e−6, 0.001, 20], and the initial values were equal to the lower limits. In the second round of fitting, the same fitting sample data as in the first round of fitting were used, and the upper limits of $T_{1a}$, $T_{2b}$, $M_{0b}$ were set to 120% of $T_{1a}$, $T_{2b}$, $M_{0b}$ obtained in the first round of fitting, and the lower limits were set to 80% of $T_{1a}$, $T_{2a}$, $M_{0b}$ obtained in the first round of fitting. The upper and lower limits of other parameters were consistent with the first round of fitting, and the initial values of all parameters were set to the lower limits of the parameter values.

The experimental results of this embodiment are shown in FIG. 3. It can be seen that the APT$^\#$ image and NOE$^\#$ image fitted by the NEMR method of two-step fitting can clearly display the lesions that can be seen in other modalities (lesions on T2-weighted images, white solid arrow) and also can display the lesions that are invisible in other modalities (lesions on NOE$^\#$ image, white dashed arrow), and the display effect is better than that of Example 1.

It should be noted that the above two examples are only two examples of the present disclosure, but the present disclosure is not limited thereto. For example, other ranges, such as 80 to 20 ppm, 80 to 6 ppm, can be selected for the selection frequency range of the fitting sample data in S2 of the present disclosure. Similarly, in parameter fitting, the upper and lower limits of the parameter can be adjusted according to the actual situation. The upper limit can be changed to 120%-150% of the first-round fitted value of the parameter in the first round, and the lower limit can be changed to 80%-50% of the first-round fitted value of the parameter. In addition, in the second round of fitting, the combination of parameters that need to change the upper and lower limit values can be varied, for example, besides $T_{1a}$, $T_{2b}$, $M_{0b}$, $T_{1a}$, $T_{2b}$ or $T_{2b}$, $M_{0b}$ and the like may also be selected. When fitting, the initial values of parameters are set to reasonable values within the upper and lower limits, or several different values can be randomly or uniformly set within the upper and lower limits, and a candidate value with the smallest fitting error can be selected as the final initial value.

In addition, in another preferred embodiment of the present disclosure, the CEST data fitting method based on the extrapolated semisolid magnetization transfer reference signal can be stored in a computer program and a computer-readable storage medium. When the computer program is called and executed by the processor, the CEST data fitting method based on an extrapolated semisolid magnetization transfer reference signal can be implemented according to the above method.

Similarly, in another preferred example the present disclosure, there is also provided a CEST data fitting apparatus based on Numerical Fit of Extrapolated Semisolid Magnetization Transfer Reference Signal, which includes a processor and a storage medium, and a computer program is stored on the storage medium. When the executed by the processor, computer program implements the CEST data fitting method based on an extrapolated semisolid magnetization transfer reference signal.

The computer-readable storage medium is generally provided in the form of memory hardware, and the memory may include Random Access Memory (RAM) or Non-Volatile Memory (NVM), for example at least one disk memory.

The processor of the above processing program can be a general-purpose processor, including a Central Processing Unit (CPU), a Network Processor (NP), etc.; it may also be a Digital Signal Processing (DSP), an application specific integrated circuit (ASIC), a Field-Programmable Gate Array (FPGA) or other programmable logic devices, discrete gate or transistor logic devices and discrete hardware components.

Of course, with the wide application of cloud servers, the above software programs can also be carried on the cloud platform to provide corresponding services, therefore the computer-readable storage medium is not limited to the form of local hardware.

In another preferred example, the CEST data fitting method based on an extrapolated semisolid magnetization transfer reference signal can be integrated into the control unit of the magnetic resonance imaging apparatus in the form of a program. The magnetic resonance imaging apparatus should include a conventional magnetic resonance scanner and a control unit. The magnetic resonance scanner can be realized by using the existing technology, and it belongs to a mature commercial product, which will not be repeated here. In addition to the above computer programs, the control unit should also have imaging sequences and other software programs necessary to realize CEST imaging. The magnetic resonance scanner is used to obtain a CEST image by magnetic resonance CEST imaging, and the control unit can obtain the CEST image obtained by the magnetic resonance scanner, and the control unit stores the computer program mentioned above, which, when executed, is used to implement the CEST data fitting method based on an extrapolated semisolid magnetization transfer reference signal and output a CEST effect value of each voxel to eliminate the background interference signals.

Those skilled in the art should know that the modules and functions involved in the present disclosure can be completed by circuits, other hardware or executable program codes, as long as the corresponding functions can be realized. If the code is used, it can be stored in the storage apparatus and executed by the corresponding components in the computing apparatus. The implementation of the present disclosure is not limited to any particular combination of hardware and software. All hardware models in the present disclosure can adopt commercially available products and can be selected according to actual user requirements. Of course, other necessary hardware or software is also needed in the magnetic resonance CEST imaging sequence and apparatus, which will not be described here.

The examples described above are only optimal solutions of the present disclosure, but it is not intended to limit the present disclosure. Those skilled in the relevant technical field can make various changes and modifications without departing from the spirit and scope of the present disclosure. Therefore, all technical solutions obtained by equivalent substitution or equivalent transformation fall within the protection scope of the present disclosure.

What is claimed is:

1. A CEST data fitting method based on an extrapolated semisolid magnetization transfer reference signal, wherein step S1 to step S3 are executed in sequence for each voxel in a CEST image to obtain a CEST effect value of each voxel whose background interference signals are eliminated; wherein the step S1 to the step S3 are as follows:

step S1, performing an offset correction with a main magnetic field frequency B0 on an obtained original Z spectrum to obtain a corrected Z spectrum;

step S2, taking part of data points, in the corrected Z spectrum, only containing an MT effect as fitting sample data, and fitting a two-pool model preset with initial values and upper and lower limits of undetermined parameters to obtain fitted values of the undetermined parameters;

the two-pool model is expressed as $\vec{M}(t+\Delta t) = \exp(\vec{A}\Delta t)\vec{M}(t)$;

where exp represents an exponential function based on a natural constant e; $\Delta t$ represents an increment at a time t; $\vec{M}(t+\Delta t)$ and $\vec{M}(t)$ respectively represent magnetization vectors of a time $t+\Delta t$ and the time t, wherein $$\vec{M} = \begin{pmatrix} M \\ 1 \end{pmatrix},$$

a matrix $M = [M_{xa}, M_{ya}, M_{za}, M_{zb}]^T$, $M_{xa}, M_{ya}, M_{za}, M_{zb}$ are respectively an x-direction magnetization of a water group, a y-direction magnetization of the water group, a z-direction magnetization of the water group and a z-direction magnetization of an MT group; a coefficient matrix $$\vec{A} = \begin{pmatrix} A & C \\ 0 & 0 \end{pmatrix},$$

where a matrix $$A = \begin{pmatrix} -R_{2a} & -\Delta\omega_a & 0 & 0 \\ \Delta\omega_a & -R_{2a} & -\omega_1 & 0 \\ 0 & \omega_1 & -R_{1a} - k_{ab} & k_{ba} \\ 0 & 0 & k_{ab} & -R_{1b} - R_{rfb} - k_{ba} \end{pmatrix},$$

a vector $C = [0, 0, R_{1a}M_{0a}, T_{1b}M_{0b}]^T$, where $\Delta\omega_a$ represents a frequency difference between an externally applied radio-frequency pulse and water, $\omega_i$ represents an applied radio-frequency pulse intensity, $k_{ab}$ represents an exchange rate from the water group to the MT group, $k_{ba}$ represents an exchange rate from the MT group to the water group, $R_{rfb}$ represents a loss rate of a longitudinal magnetization of pool b caused by saturation pulses, $\Delta\omega_b$ represents a frequency difference between the externally applied radio-frequency pulse and MT, $R_{1a} = 1/T_{1a}$ and $R_{2a} = 1/T_{2a}$ respectively represent a longitudinal relaxation rate and a transverse relaxation rate of the water group, $R_{1b} = 1/T_{1b}$ and $R_{2b} = 1/T_{2b}$ respectively represent a longitudinal relaxation rate and a transverse relaxation rate of the MT group, $M_{0a}$ and $M_{0b}$ respectively represent steady-state magnetization intensities of the water group and the MT group;

the undetermined parameters in the two-pool model are $T_{1a}, T_{2a}, T_{2b}, M_{0b}, k_{ba}$; and step S3, obtaining a fitted curve containing the MT effect based on the two-pool model into which the fitted values are substituted, and taking a difference between the fitted curve and the corrected Z spectrum at a frequency of interest as the CEST effect value whose background interference signals are eliminated.

2. The CEST data fitting method based on an extrapolated semisolid magnetization transfer reference signal according to claim 1, wherein in the step S2, there are two rounds of fitting for the undetermined parameters in the two-pool model; during a first round of fitting, parameter optimization is performed for five undetermined parameters within the preset upper and lower limits thereof by using the fitting sample data to obtain a first round of fitted values; during a second round of fitting, upper and lower limits narrower than the upper and lower limits of the first round of fitting are selected with the first round of fitted value as the center, and the two-pool model is fitted with the same fitting sample data as in the first round of fitting for a second round with a higher precision to obtain final fitted values of the undetermined parameters;

during the second round of fitting, only part of the five undetermined parameters of the two-pool model are selected for adjustment of upper and lower limits thereof, and the upper and lower limits of the remaining parameters keep consistent with those of the first round of fitting; and during the second round of fitting, a parameter combination of the upper and lower limits is required to be changed to $T_{1a}, T_{2b}, M_{0b}, T_{1a}, T_{2b},$ or $T_{2b}, M_{0b}$.

3. The CEST data fitting method based on an extrapolated semisolid magnetization transfer reference signal according to claim 1, wherein in the step S2, the data points only containing the MT effect are data points with frequencies ranging from 80 to 6 ppm.

4. The CEST data fitting method based on an extrapolated semisolid magnetization transfer reference signal according to claim 2, wherein in the step S2, during the first round of fitting, the preset upper limits of the undetermined parameters $T_{1a}, T_{2b}, T_{2b}, M_{0b}, k_{ba}$ are $[1.5, 0.25, 12e^{-6}, 0.16, 40]$, and the preset lower limits are $[0.6, 0.065, 8e^{-6}, 0.001, 20]$.

5. The CEST data fitting method based on an extrapolated semisolid magnetization transfer reference signal according to claim 2, wherein in the step S2, during the second round of fitting, for the parameters whose upper and lower limits need to be changed, the upper limit values of the parameters are changed to 120%-150% of the first-round fitted values of the parameters, and the lower limit values of the parameters are changed to 80%-50% of the first-round fitted values of the parameters.

6. The CEST data fitting method based on an extrapolated semisolid magnetization transfer reference signal according to claim 2, wherein in the step S2, the loss rate of the longitudinal magnetization of pool b caused by saturation pulses is $R_{rfb} = \omega_1^2 \pi g(2\pi\Delta\omega_b)$, where $g(\cdot)$ represents a lineshape function, and the lineshape function comprises Lorentzian type, Gaussian type or super Lorentzian type.

7. The CEST data fitting method based on an extrapolated semisolid magnetization transfer reference signal according to claim 6, wherein in the step S3, the frequency of interest is 3.5 ppm or −3.5 ppm, a CEST effect value corresponding to the frequency of interest of 3.5 ppm is an APT[#] value, and a CEST effect value corresponding to the frequency of interest of −3.5 ppm is a NOE[#] value.

8. A non-transitory computer-readable storage medium, wherein a computer program is stored on the storage medium, and when executed by a processor, the computer program implements CEST data fitting method based on the extrapolated semisolid magnetization transfer reference signal according to claim 1.

9. A magnetic resonance imaging apparatus for eliminating a CEST imaging interference effect, comprising a magnetic resonance scanner and a control unit, wherein the magnetic resonance scanner is configured for acquiring a CEST image by magnetic resonance CEST imaging; the control unit is capable of acquiring the CEST image, and a computer program is stored in the control unit; when executed, the computer program is configured for implementing the CEST data fitting method based on the extrapolated semisolid magnetization transfer reference signal according to claim 1, and outputting a CEST effect value of each voxel whose background interference signals are eliminated.

\* \* \* \* \*